Dec. 6, 1938.   A. EBINGER   2,139,447
ELECTRIC CONDENSER
Filed Aug. 23, 1935
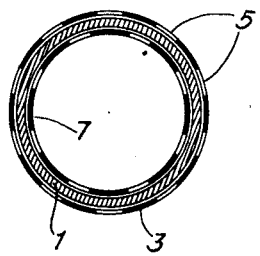
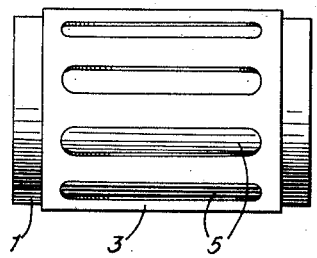
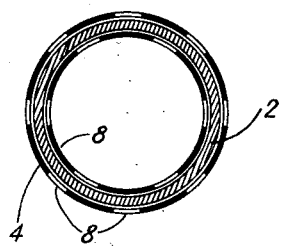
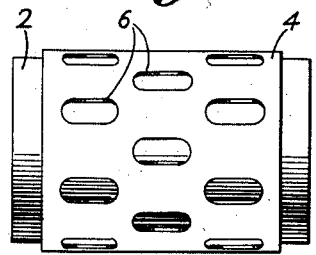
INVENTOR:
ANDREAS EBINGER
BY
ATTORNEY.

Patented Dec. 6, 1938

2,139,447

UNITED STATES PATENT OFFICE 2,139,447

ELECTRIC CONDENSER

Andreas Ebinger, Berlin-Siemensstadt, Germany, assignor to Siemens & Halske Aktiengesellschaft, Siemensstadt, near Berlin, Germany, a corporation of Germany Application August 23, 1935, Serial No. 37,442
In Germany September 19, 1934

8 Claims. (Cl. 175—41)

This invention relates to a new and novel way of making electric condensers. Electric condensers are known in the prior art in which the dielectric consists of a tube of ceramic material, glass, or the like, while the coats thereof are obtained by spraying or depositing metal upon the dielectric material. The balancing or adjustment of such a condenser to a definite or rated capacity value, as a general rule, is insured by removing part of the outer coat or metallic surface area in such a way that the edges free from coat are enlarged by grinding, etching, or the like. In the same measure as the surface area of the outer coat is diminished in comparison with the surface area of the inner coat, the electrostatic screening effect of the condenser metallic coat is also varied and reduced.

The invention is concerned with an electric condenser, more especially one of the kind as hereinbefore described. The same consists in that, for the purpose of capacity balancing or adjustment, portions of the metallic surface area of the coats are systematically removed in such a way that the outer coat will produce or maintain a screening effect with reference to the inner metallic surface area. Adjustment of capacity according to this invention is accomplished and the shielding is insured by partial removal of the surface area of the inner coat until the desired capacity value has been established; or else by removal of only some isolated portions of the surface area of the outer coat so that a continuous grate or reticular pattern of metal coat remains upon the outer surface of the insulation tubelet.

By the scheme here disclosed the insulating edges or end margins of the uncoated ceramic material can be maintained narrow for the purpose of securing the requisite puncture strength.

In the drawing are shown two exemplified embodiments of the invention.

Fig. 1 is a side view of a tubular condenser having an inner and outer coat, the removed portion being of slots of relatively long length.

Fig. 2 is a side view of a tubular condenser having an inner and outer coat, the removed portion being of slots of relatively short length.

Fig. 3 is a cross-section of Fig. 1.

Fig. 4 is a cross-section of Fig. 2.

Referring now in detail to Figs. 1 and 3 of the drawing, the tubular condenser of this invention comprises a tube 1 of ceramic material or glass which also serves as the active dielectric for the condenser. The inner and outer surface of tube 1 is coated with a metallic or outer coat 3 and inner coat 7. The long slots 5 in the inner and outer layers are arranged offset from one another as shown, so that when it is desired to remove a portion of the metallic layers to reduce the capacity of a condenser to a desired value, there will only be maintained an overlap of the metallic surface area which is sufficient to ensure a good electrostatic shield having screening effects.

In Figs. 2 and 4, the ceramic tube 2 is coated with an outer metallic coat 4 and an inner coat 8 which are similar to that of Figs. 1 and 3, except that the slots are of relatively short length and are located in staggered relationship with each other, and they are also in staggered relationship with the inner slots on the outer metallic surface 8.

I claim:

1. An electric condenser comprising a tube of ceramic material acting as the dielectric of said condenser, a metallic coat on the inner and outer surface of said tube, a margin of uncoated ceramic material at each end of said tube, a plurality of longitudinally arranged slots in both the inner and outer metallic coats, the arrangement of said slots being such that there is provided an electrostatic screen for said condenser.

2. An electric condenser comprising a tube of ceramic material acting as the dielectric of said condenser, a metallic coat on the inner and outer surface of said tube, a margin of uncoated ceramic material at each end of said tube, a plurality of relatively short longitudinally arranged slots in both the inner and outer metallic coats, the arrangement of said slots being such that there is provided an electrostatic screen for said condenser.

3. An electric condenser comprising a tube of glass material acting as the dielectric of said condenser, a metallic coat on the inner and outer surface of said tube, a margin of uncoated glass at each end of said tube, a plurality of longitudinally arranged slots in both the inner and outer metallic coats, the arrangement of said slots being such that there is provided an electrostatic screen for said condenser.

4. An electric condenser comprising a tube of glass material acting as the dielectric of said condenser, a metallic coat on the inner and outer surface of said tube, a margin of uncoated glass at each end of said tube, a plurality of relatively short longitudinally arranged slots in both the inner and outer metallic coats, the arrangement of said slots being such that there is provided an electrostatic screen for said condenser.

5. An electric condenser according to claim 1 with the characteristic feature that the capacity of the condenser is adjusted by removing a portion of the metallic coat by grinding away the surface at the edges of said slots.

6. An electric condenser according to claim 2 with the characteristic feature that the capacity of the condenser is adjusted by partially removing a portion of the inner coat by grinding the metallic surface at the edges of the said slots.

7. An electric condenser comprising a tube of ceramic material acting as a dielectric of said condenser, a metallic coat on the inner and outer surfaces of said tube, a margin of uncoated ceramic material at each end of said tube, a plurality of parallel arranged slots in both the inner and outer metallic coats, the arrangement of said slots being such that there is provided an electrostatic screen for said condenser.

8. An electric condenser comprising a tube of ceramic material, acting as a dielectric of said condenser, a metallic coat on the inner and outer surfaces of said tube, a margin of uncoated ceramic material at each end of said tube, a plurality of parallel arranged slots having a width substantially equal to the width of said margins in both the inner and outer metallic coats, the arrangement of said slots being such that there is provided an electrostatic screen for said condenser.

ANDREAS EBINGER.